Patented Aug. 15, 1933

UNITED STATES PATENT OFFICE 1,922,459

ETHERS OF POLYHYDRIC ALCOHOLS AND THEIR PRODUCTION

Otto Schmidt, Ludwigshafen-on-the-Rhine, and Egon Meyer, Mannheim, Germany, assignors to I. G. Farbenindustrie Aktiengesellschaft, Frankfort-on-the-Main, Germany, a Corporation of Germany No Drawing. Application March 21, 1928, Serial No. 263,588, and in Germany March 26, 1927

24 Claims. (Cl. 260—106)

This invention relates to the production of etherified polyhydroxy alcohols and their derivatives.

We have found that the commercially very valuable polyhydroxy etherified alcohols, or their derivatives, are readily obtained by acting upon polyhydroxy alcohols containing more than 2 carbon atoms and their derivatives containing at least one free hydroxyl group with alkylene oxids, their derivatives and conversion products in the presence, if desired, of other agents.

The said polyhydroxy alcohols and their derivatives such as the partly esterified or otherwise substituted polyhydroxy alcohols comprise glycerol, erythritol, pentaerythritol, sorbitol or alcohols derived from other sugars such as the pentoses, hexoses and other sugars, which for the sake of brevity, will be referred to as polyhydroxy alcohols in the following and in the claims. The alkylene oxids or their derivatives and conversion products comprise, for example, ethylene oxid, propylene oxid, tetrahydrobenzene oxid, glycolchlorhydrin, mono- and di-chlorhydrin, epichlorhydrin, together with their ethers and esters and the like, which, for the sake of brevity, in the following and in the claims will be referred to as alkylene oxids. The reaction is preferably conducted at an elevated temperature, in the presence or absence of diluents or solvents. The application of pressure is often very advantageous, especially in the case of employing the alkylene oxids of low boiling point. When halogenhydrins or esters are employed it is preferable to operate in the presence of agents neutralizing strong acids such as hydroxids, carbonates, phosphates, acetates and the like of the alkali metals or alkaline earth metals. The use of condensing agents, also, is often advantageous to the reaction; thus the action of alkylene oxids on high-valent alcohols is facilitated by small additions of acids, such as boric or sulfuric acid.

The first result of the reaction is the formation of etherified alcohols of high boiling point, which are more or less viscous. In many cases they have the advantage over the high grade alcohols already known such as glycerol, of having a very low hydroscopicity and at least the same viscosity and lubricating quality. In numerous cases they can be used as substitutes for the polyhydroxy alcohols, whether in connection with papermaking, dyeing, the explosives industry, textile industry, or as lubricants for machinery and the like.

The etherified alcohols prepared in this manner, and their derivatives, are also applicable for solvent or separation purposes.

The mixed higher etherified alcohols and their derivatives obtained in the manner described above, can be further improved by converting them in so far as they do not already contain acid radicles, into highly valuable products by the introduction of acyl groups, which products can be used for numerous industrial purposes by reason of their solubility in a large number of organic, liquid and solid substances, and also by reason of their high dissolving power and plasticity, so that they can be used for many purposes as softening agents, camphor substitutes and the like.

Important acyl derivatives of the said initial materials are the esters of monocarboxylic acids, such as formic acid, acetic acid, benzoic acid and the like, and also the esters of polybasic carboxylic acids, such as oxalic acid, maleic acid, succinic acid, phthalic acid and the like, and the esters of inorganic acids, particularly nitric acid. The esters of nitric acid are of great importance, especially in the manufacture of films, plastics or lacquers or explosives.

These acylation products are distinguished by a very low volatility, so that they can be employed, for example, as plasticizing agents or camphor substitutes in the manufacture of films, plastics or lacquers.

The following examples will further illustrate the nature of the said invention which however is not limited thereto. The parts are by weight.

Example 1

200 parts of sorbitol are heated with 350 parts of ethlyene oxid in an autoclave, for about 12 hours at 140° centigrade. After no further decrease in pressure is observed, the contents are allowed to cool, and the surplus of ethylene oxid is removed by relieving the pressure and by the application of heat. The reaction product is obtained, in approximately quantitative yield, as a highly viscous, water white liquid, which is only slightly hygroscopic and cannot be distilled without decomposition at atmospheric pressure.

Example 2

300 parts of penta-erythritol are heated in an autoclave together with 500 parts of ethylene oxid and 3 parts of boric anhydrid for about 20 hours to 125° C. After the reaction the remainders of ethylene oxid are removed, and the very viscous, brownish syrup obtained is dissolved in water and treated several times with animal charcoal or a similar decolorizing agent. The water is then distilled off in vacuo whereby 687 parts of a colorless, clear viscous liquid are obtained, which cannot be distilled at atmospheric pressure without decomposition and is readily soluble in water, acetone or alcohol but insoluble in ethylether or hydrocarbons.

Example 3

100 parts of commercial gelatine are melted with 700 parts of water at from 30° to 40° centigrade, whereupon 10 to 15 parts of the etherified alcohol obtained from sorbitol according to Example 1 are added. Glass plates are dipped into this solution, and the films adhering to these plates, when taken out, are caused to solidify by cooling to below 30° centigrade. When thoroughly cooled, the solidified films are stripped off and then form thin, extremely flexible and transparent films which have the advantage over gelatine films made with the aid of glycerol in that they are far less hydrogroscopic. They are applicable as wrapping for foodstuffs, chocolate, confectionery and numerous other purposes.

Other ether alcohols prepared according to this invention, for example from pentaerythritol or butyleneglycol can also be empolyed as softening agents for gelatine, and they may be used with advantage as a substitute for glycerol in many other instances.

Example 4

300 parts of the product resulting from the action of ethylene oxid on sorbitol at about 150° centigrade under pressure, are acylated with 510 parts of acetic anhydrid at about from 105° to 110° centigrade in the presence of a small quantity, such as 1 part, of sulfuric acid, care being taken to ensure adequate cooling, the reaction being accompanied by a very considerable evolution of heat. When the reaction has ceased, the product is taken up with ethylether after removing the remainders of acetic anhydrid and is shaken up, first with water and then with concentrated sodium carbonate solution, to remove the excess of acid, the etheral solution being then dried and the ether evaporated. A highly viscous liquid is obtained which cannot be distilled at atmospheric pressure without undergoing decomposition, and which is an excellent solvent for numerous organic substances, and in particular, forms a quick acting swelling medium for nitrocellulose.

Example 5

224 parts of the partially etherified glycerol, obtained from 92 parts of anhydrous glycerol and 170 parts of etheylene oxid, with addition of a little boric acid, under pressure at 150° centigrade, are heated with 222 parts of phthalic anhydrid for several hours at from 180° to 185° centigrade, until a nearly colorless tough, non-brittle resin is formed.

The product may be employed as an artificial resin, either alone or mixed with other substances such as the artificial resin, marketed under the trade-name "Glyptal" resin and possesses over the last named resin the advantage of greater softness. For this reason it may be employed, for example, as an addition to the said artificial resin and the like, the hardness and brittleness of which it is capable of considerably dimnishing.

Similar products are obtainable from other polybasic acids and other hydroxyl-bearing ethers of polyhydroxy alcohols.

What we claim is:

1. The process of producing etherified polyhydroxy alcohols which comprises acting upon a polyhydroxy alcohol, containing more than 2 carbon atoms and oxygen solely in the form of hydroxyl groups, with an alkylene oxid.

2. The process of producing etherified polyhydroxy alcohols which comprises acting upon a polyhydroxy alcohol, containing more than 2 carbon atoms and oxygen solely in the form of hydroxyl groups, with an alkylene oxid in the presence of an acid condensing agent.

3. The process of producing etherified polyhydroxy alcohols which comprises acting upon a polyhydroxy alcohol, containing more than 2 carbon atoms and oxygen solely in the form of hydroxyl groups, with an alkylene oxid at a pressure above atmospheric pressure.

4. The process of producing etherified polyhydroxy alcohols which comprises acting upon a polyhydroxy alcohol, containing more than 2 carbon atoms and oxygen solely in the form of hydroxyl groups, with an alkylene oxid at a pressure above atmospheric pressure and in the presence of an acid condensing agent.

5. The process of producing etherified polyhydroxy alcohols which comprises acting upon a polyhydroxy alcohol, containing more than 2 carbon atoms and oxygen solely in the form of hydroxyl groups, with an alkylene oxid and acylating the resulting product.

6. The process of producing etherified polyhydroxy alcohols which comprises acting upon a polyhydroxy alcohol, containing more than 2 carbon atoms and oxygen solely in the form of hydroxyl groups, with an alkylene oxid in the presence of an acid condensing agent and acylating the resulting product.

7. The process of producing etherified polyhydroxy alcohols which comprises acting upon a polyhydroxy alcohol, containing more than 2 carbon atoms and oxygen solely in the form of hydroxyl groups, with ethylene oxid at a pressure above atmospheric pressure.

8. The process of producing etherified polyhydroxy alcohols which comprises acting upon a polyhydroxy alcohol, containing more than 2 carbon atoms and oxygen solely in the form of hydroxyl groups, with ethylene oxid at a pressure above atmospheric pressure and acylating the resulting product.

9. As products, viscous monohydroxy alkyl ethers of polyhydroxy alcohols, which alcohols contain more than 2 carbon atoms and oxygen solely in the form of hydroxyl groups.

10. As products, viscous polyhydroxy alcohols, which alcohols contain more than 2 carbon atoms and oxygen solely in the form of hydroxyl groups, with part of the hydroxyl groups etherified by a monohydroxy alkyl group and at least one acylated hydroxy alkyl group.

11. As products, viscous polyhydroxy alcohols, which alcohols contain from 3 to 6 carbon atoms and oxygen solely in the form of hydroxyl groups, with part of the hydroxyl groups etherified by a monohydroxy alkyl group.

12. As products, viscous polyhydroxy alcohols, which alcohols contain from 3 to 6 carbon atoms and oxygen solely in the form of hydroxyl groups, with part of the hydroxyl groups etherified by a hydroxy-ethyl group.

13. As products, viscous polyhydroxy alcohols, which alcohols contain from 3 to 6 carbon atoms and oxygen solely in the form of hydroxyl groups, with part of the hydroxyl groups etherified by a hydroxy-ethyl group and at least one acylated hydroxy-ethyl group.

14. As products, viscous monohydroxy alkyl ethers of glycerol.

15. As products, viscous monohydroxy alkyl ethers of pentaerythritol.

16. As products, viscous monohydroxy alkyl ethers of sorbitol.

17. The process of producing etherified polyhydroxy alcohols which comprises acting at between about 125° and about 150° C. upon a polyhydroxy alcohol, containing more than 2 carbon atoms and oxygen solely in the form of hydroxyl groups, with an alkylene oxide.

18. The process of producing etherified polyhydroxy alcohols which comprises acting at between about 125° and about 150° C. upon a polyhydroxy alcohol, containing more than 2 carbon atoms and oxygen solely in the form of hydroxyl groups, with an alkylene oxide in the presence of an acid condensing agent.

19. The process of producing etherified polyhydroxy alcohols which comprises acting at between about 125° and about 150° C., upon a polyhydroxy alcohol, containing more than 2 carbon atoms and oxygen solely in the form of hydroxyl groups, with an alkylene oxide at a pressure above atmospheric pressure.

20. The process of producing etherified polyhydroxy alcohols which comprises acting at between about 125° and about 150° C., upon a polyhydroxy alcohol, containing more than 2 carbon atoms and oxygen solely in the form of hydroxyl groups, with an alkylene oxide at a pressure above atmospheric pressure in the presence of an acid condensing agent.

21. The process of producing etherified polyhydroxy alcohols which comprises acting at between about 125° and about 150° C., upon a polyhydroxy alcohol, containing more than 2 carbon atoms and oxygen solely in the form of hydroxyl groups, with an alkylene oxide, and acylating the resulting product.

22. The process of producing etherified polyhydroxy alcohols which comprises acting at between about 125° and about 150° C., upon a polyhydroxy alcohol, containing more than 2 carbon atoms and oxygen solely in the form of hydroxyl groups, with an alkylene oxide in the presence of an acid condensing agent, and acylating the resulting product.

23. The process of producing etherified polyhydroxy alcohols which comprises acting at between about 125° and about 150° C., upon a polyhydroxy alcohol, containing more than 2 carbon atoms and oxygen solely in the form of hydroxyl groups, with ethylene oxide.

24. The process of producing etherified polyhydroxy alcohols which comprises acting at between about 125° and about 150° C., upon a polyhydroxy alcohol, containing more than 2 carbon atoms and oxygen solely in the form of hydroxyl groups, with ethylene oxide at a pressure above atmospheric pressure.

OTTO SCHMIDT.
EGON MEYER.